July 22, 1947.  C. B. HORSLEY  2,424,357
METHOD OF AND APPARATUS FOR MODULATING THE FREQUENCY OF SOUND WAVES
Filed Dec. 19, 1945  3 Sheets-Sheet 1
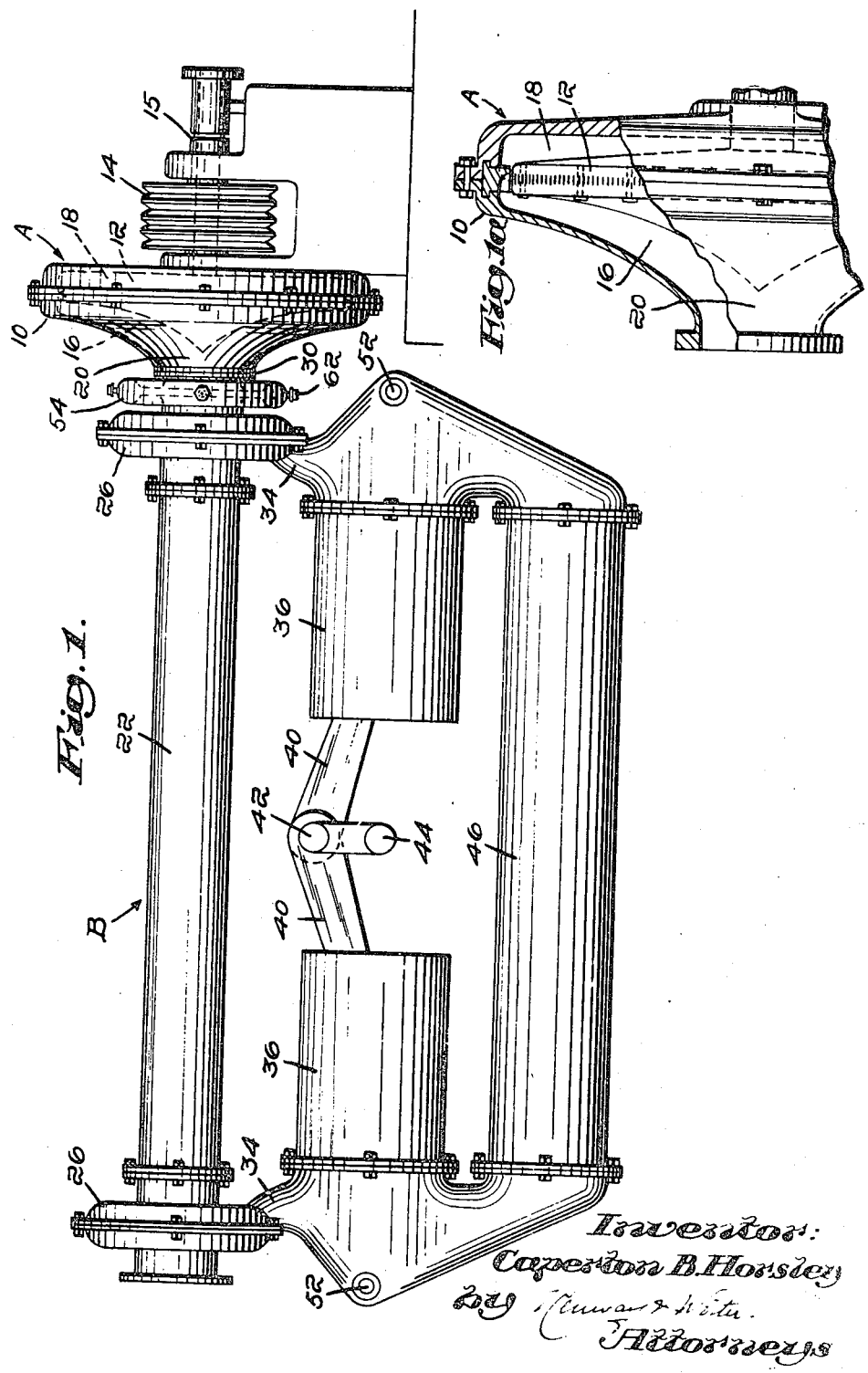

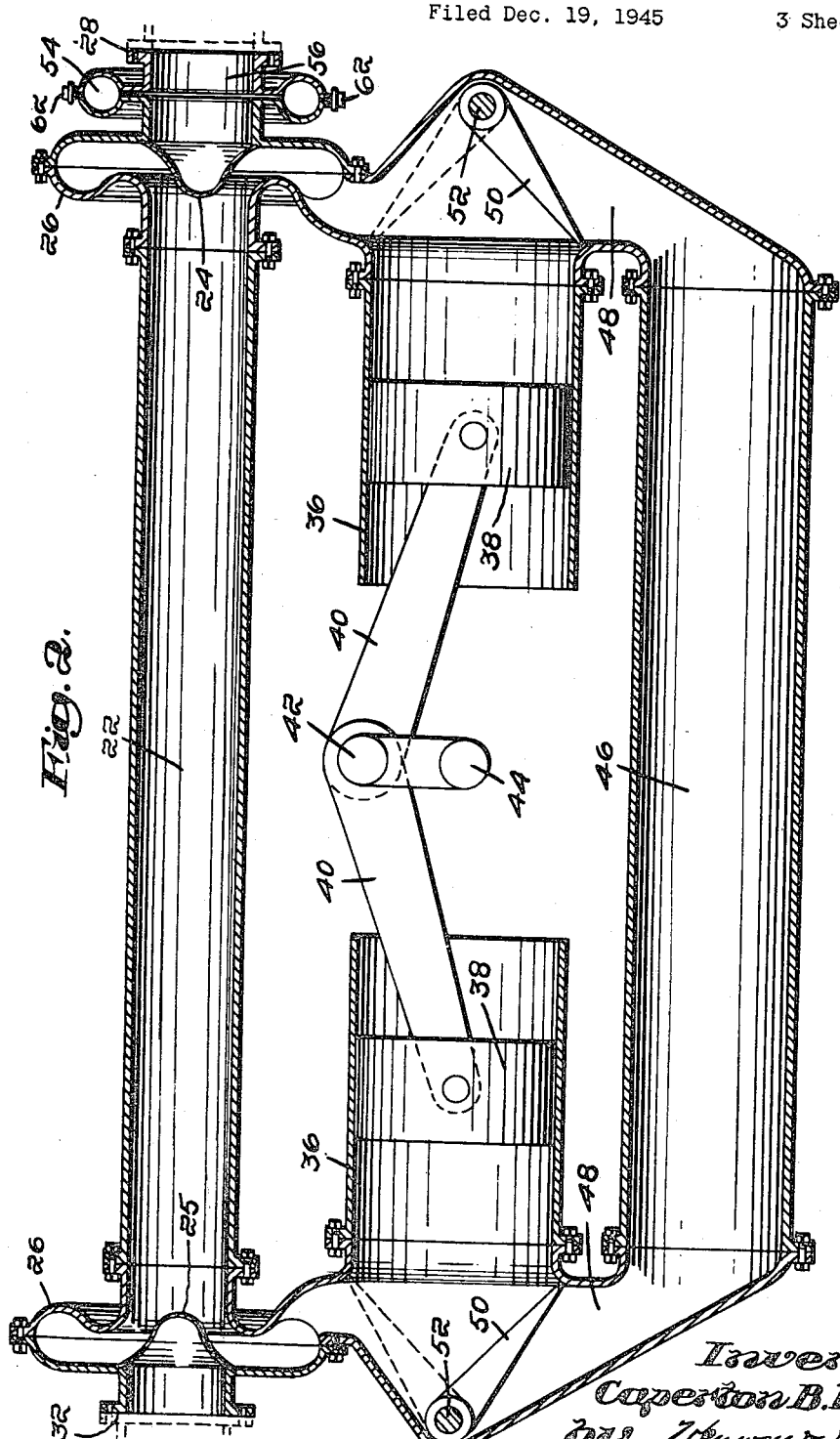

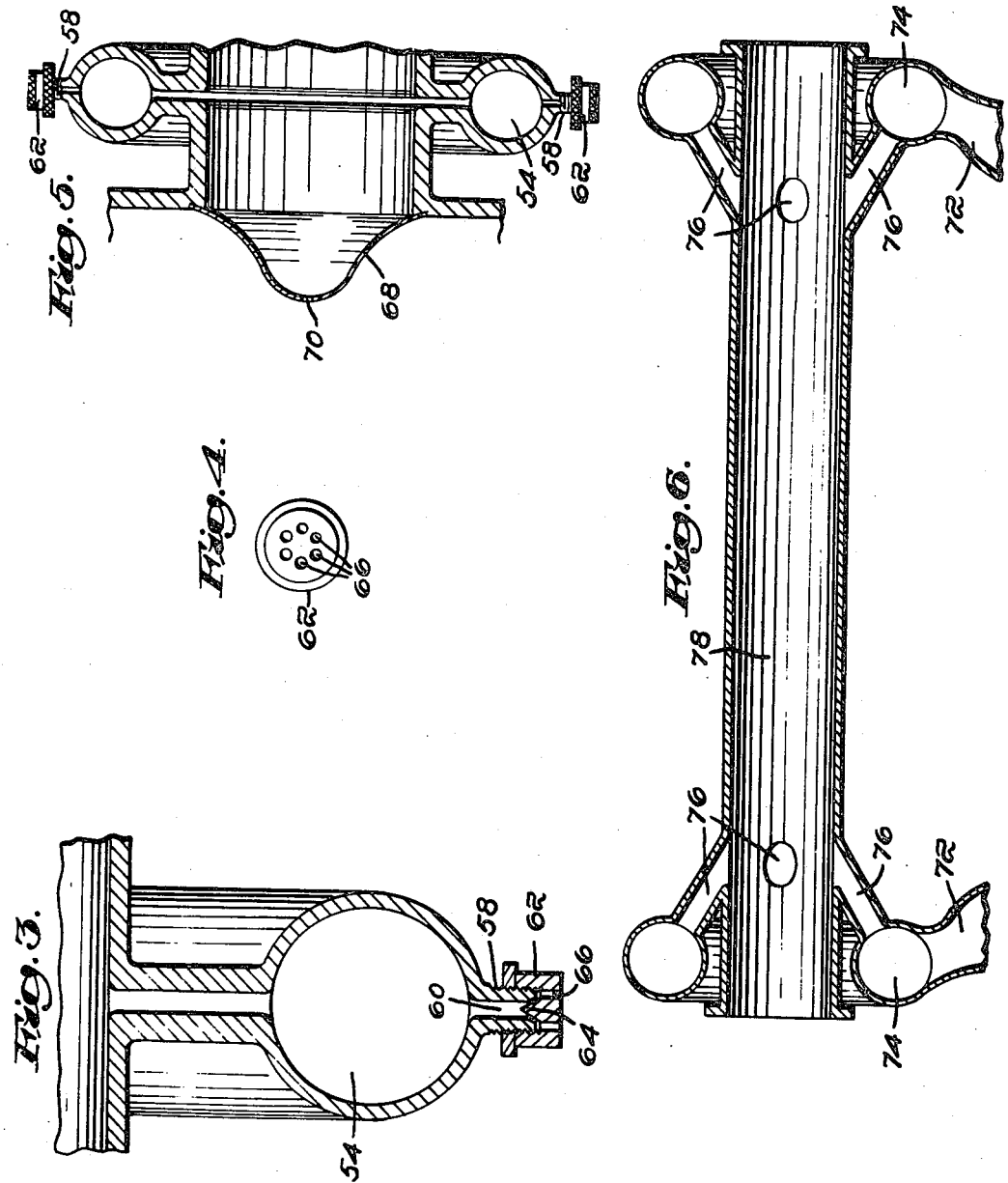

Patented July 22, 1947

2,424,357

UNITED STATES PATENT OFFICE 2,424,357

METHOD OF AND APPARATUS FOR MODULATING THE FREQUENCY OF SOUND WAVES

Caperton B. Horsley, Stamford, Conn., assignor to Ultrasonic Corporation, Boston, Mass., a corporation of Massachusetts Application December 19, 1945, Serial No. 636,038

21 Claims. (Cl. 116—137)

This invention relates to a method of and apparatus for modulating the frequency of vibrations and particularly concerns the generation of pressure wave impulses of predetermined frequency in substantial volume and the modulation thereof to vary the frequency continuously, rapidly and repeatedly over a wide predetermined range.

Supersonic frequencies have been employed for various purposes including the homogenizing and emulsifying of liquids, the determining of flaws in castings or other solids, the sterilizing of foods, etc., and much experimental work has been carried out in connection therewith. Considering, for example, the problem of obtaining complete sterilization in foods, it is known that the micro-organisms to be destroyed not only vary in size and shape but also that micro-organisms of approximately the same size and shape will vary in orientation with respect to the direction of the pressure waves and this orientation may vary as the organism moves. Furthermore, the shapes of some micro-organisms will vary as they swell or contract, as in going through the process of reproduction. It is also known that most, if not all micro-organisms may be so disrupted at some particular frequency at an obtainable energy level that it will be killed, most micro-organisms being particularly susceptible to destruction by vibrations of certain frequencies which appear to be especially effective against some vital part or parts of the organisms. However the particular frequency that will destroy a particular micro-organism at energy levels that can be obtained will depend on the size, shape and orientation of the micro-organism at the moment this frequency is applied. My invention contemplates the generation and production of pressure wave vibrations in substantial volume and so continuously, rapidly and repeatedly modulated over a wide range of frequencies as to bombard such micro-organisms at the necessary frequencies to effect sterilization.

As the frequency is varied and the micro-organism changes in shape or orientation it seems that a point can be reached where for an instant the frequency is in substantial resonance with the fatally susceptible frequency of the micro-organism but, if this period of resonance exists only for a very short time and does not reoccur quickly again and repeatedly, the micro-organism may not be killed, destroyed or disrupted. If however the variation in the frequency can be made to reoccur over sufficiently short periods of time so that it is repeated with sufficient rapidity, the cumulative effect of these repeated resonant periods should result in sterlization. The substantial resonance required to effect sterilization would be therefore such as would repeatedly, rapidly and substantially continuously bombard the micro-organisms at fatally susceptible frequencies.

Due to possible change in shape or orientation of clusters of globules in a liquid in motion, it seems that some of the above effect may likewise apply to certain emulsifying or homogenizing problems and, when sterilizing or emulsifying, it may sometimes be desirable to pass the material to be processed very rapidly over a comparatively small area of intense sound waves and in this case it is necessary to change the frequency quickly in order to subject all of the material to the entire range. A primary object of my invention resides in the production of a modulated frequency of this nature, as hereinafter more specifically described, which will effect sterilization, homogenization, emulsification and precipitation in various products.

These and other features of the invention will be best understood and appreciated from the following description of preferred embodiments thereof selected for purposes of illustration and shown in the accompanying drawings in which, Fig. 1 is a front elevation of a generator and modulating apparatus embodying my invention, Fig. 1a is a fragmentary view, partly in cross-section, of the generator, Fig. 2 is an enlarged sectional view through the modulating apparatus, Fig. 3 is a view in cross-section through the delivery end of the generator of Fig. 2, Fig. 4 is an elevation of a portion of Fig. 3, Fig. 5 is a fragmentary view illustrating a modification of Fig. 2, and Fig. 6 illustrates a further modification.

The apparatus illustrated in the drawings comprises a machine A for generating pressure wave impulses of predetermined frequency and a cooperating mechanism B for receiving and modulating such impulses through a predetermined range. The machine A embodies the subject matter of a copending application Serial No. 624,504 filed October 25, 1945, and forms a part of this application only in combination with the mechanism B.

The machine A, more specifically described in said copending application, comprises a housing 10 within which is a rotor 12 adapted to be rotated by a V-belt pulley 14. Air is forced into the rotor 12 through the tubular axle 15 and is projected outwardly therefrom in predetermined impulses and alternately into chambers 16 and 18 disposed at opposite sides of the rotor. The impulses in the chamber 16 are conducted to the centrally disposed portion 20 of the chamber which is attached to the modulator B. The frequency of the impulses delivered by the machine A varies in proportion to the speed of rotation of the rotor. It is desirable for purposes heretofore and hereinafter described to modulate or vary the frequency of these impulses continuously, repeatedly and rapidly through a wide and predetermined range and the mechanism B is provided to perform this function. While the frequency can be varied continuously and repeatedly by the machine A, by varying the speed of rotation of the rotor, such variation cannot be rapidly effected due to the inertia of the rotor. The primary function of the modulator B is to effect such variation rapidly.

As illustrated in Figs. 2-4, the modulator B comprises a tubular chamber 22 closed at its ends by diaphragms 24 and 25 associated with annular housings 26, the annular chambers of such housings being in communication with the chamber 22. The impulse receiving end 28 of the modulator is connected with the generator at 30 in a relation placing the diaphragm 24 in axial alignment with the portion 20 of the generator and in position adapted directly to receive the impulses delivered from the chamber 16. Impulses delivered to the diaphragm 24 are adapted to travel through the air or other fluid contained within the chamber 22 and be received on the diaphragm 25 and are transmitted from the diaphragm 25 outwardly of the modulator at 32 to be used as required. It will be apparent that under normal conditions, in which the fluid in the chamber 22 remains static, the impulses received by and transmitted outwardly from the diaphragm 25 will correspond with those delivered to and transmitted from the diaphragm 24.

I have discovered that the frequency of the impulses received by and transmitted from the diaphragm 25 can be varied through a substantial range from the frequency at which the impulses are received by and transmitted from the diaphragm 24, and furthermore that the speed and extent of such variation can be quite definitely modulated and controlled and can provide such wide and rapid changes as will perform the useful functions hereinbefore and hereinafter described. The following described mechanism is adapted to apply this principle within the chamber 22.

Leading outwardly of the chamber 22 at the two housings 26 are two ports 34 and these ports are in communication with two axially aligned cylinders 36. Two pistons 38 within the cylinders are connected by piston rods 40 to a crank 42 mounted to rotate with a shaft 44. Disposed below the cylinders 36 is an elongated chamber 46 having communication at its ends 48 with the two cylinders. Two valves 50 pivotally mounted at 52 at opposite ends of the apparatus are pivotally adjustable to and from the ports 34 and the ends 48 of the chamber 46. When the valves are in the down position, illustrated in full lines in Fig. 2, the chamber 46 is cut off and the cylinders are in full communication with the ports 34 and the chamber 22.

I have illustrated an annular chamber 54, in communication with the chamber 56 forwardly of the diaphragm 24, for receiving and permitting expansion and controlled escape of the air or other fluid received from the chamber 16. Leading outwardly from the chamber 54 are preferably a plurality of nozzles 58 having ports 60, and disposed over and threaded to each of these nozzles is a member 62 provided with a port closing conical seat 64 and a plurality of escape holes 66. The arrangement is such that escape of fluid from the chamber 54 can be controlled by rotatably adjusting the members 62.

In Fig. 2 I have illustrated the diaphragms 24 and 25 as being continuous and forming a closure between the chamber 22 and the chambers at the outer sides of the diaphragms. In such case the diaphragms, which are made of flexible or resilient material, serve to transmit the impulse vibrations through the chamber 22 without transmission of any fluid. I desire it to be understood however that the invention is not to be considered as limited to a closed chamber 22 of this nature. For example, as illustrated in Fig. 5, the diaphragms 68 may have a centrally disposed opening 70 of limited size therethrough, or a plurality of smaller openings. Furthermore, as illustrated in Fig. 6, the diaphragms may be entirely omitted. In such case the ports 72, which correspond to the ports 34 in Fig. 2, will preferably enter annular chambers 74 having annular ports 76 directed acutely toward and into the chamber 78 (corresponding to chamber 22) for passing fluid in opposite directions into and from the chamber from opposing cylinders corresponding to cylinders 36.

It will be apparent that the frequency of impulses delivered by apparatus A can be varied from zero to many thousand cycles per second. However, due to the momentum of the rotor 12, an appreciable period of time is required to make wide variations in frequency. It appears that the success of some applications may depend on the modulation of the frequency continuously, quickly and repeatedly over a wide range, as hereinbefore described, and the apparatus B in combination with the generator A is adapted to effect such modulation.

It will be apparent that when the air or other fluid in the chamber 22 remains static, the impulses received by and transmitted outwardly from the diaphragm 25 will correspond with those delivered to and transmitted from the diaphragm 24. When the device is in operation it will be apparent that the fluid in the modulator chamber 22 is moved alternately toward and away from the source of the sound waves, that is the diaphragm 24. Consequently a given group of adjacent impulses may leave the diaphragm under any of three conditions, when the fluid is moving toward the diaphragm 24, is stationary, or is moving away from the diaphragm 24. Similarly, the group may leave the chamber at the diaphragm 25 under any one of the same conditions. Let us assume that the fluid is being accelerated toward the diaphragm 24 when a group of impulses leaves the diaphragm 24. The speed of sound through air remains constant but the air itself is moving counter to the direction of the sound impulses. To an observer outside the chamber 22 the rate of travel of the impulses will appear to have decreased. At the same time the distance between the successive impulses in the group will have been decreased. If the movement of the fluid medium in the chamber is unchanged, the frequency of sound will not be changed upon exit. That is to say, although the wavelength is decreased, the speed is correspondingly decreased. However, if the air or other fluid in the chamber slows down, becomes stationary or is moved in the opposite direction prior to the time the group under consideration leaves the chamber, the rate of travel of the group will increase, but the wave length will remain reduced. Consequently the frequency of the group will have been increased. It will be apparent, however, that if the group leaves the chamber under the same conditions obtaining at the time of its introduction therein, there will be no apparent change in frequency.

Therefore a group entering when the fluid flow is counter to its direction of travel and leaving when the opposite is true will exhibit a marked increase in frequency. A group entering when the fluid flow is in the same direction as the group and leaving when the opposite is true will exhibit a marked decrease in frequency. A group entering when the fluid is static and leaving when the fluid flow is counter to the direction of the group will exhibit some increase in frequency. The results under the other possible sets of conditions obey the same laws and will be evident to those skilled in the art. The phenomena involved herein are obviously akin to the well known "Doppler" effect.

In accordance with my invention, the fluid in the chamber 22 is made to flow in opposite directions in rapid succession and in such volume as to produce the frequency variation necessary to perform the desired functions. Each rotation of the shaft 44 produces a flow cycle moving the fluid in opposite directions through the chamber 22 and the rate of alternations is directly in proportion to the rotation of the shaft. The volume and speed of flow can be varied by adjusting the valves 50, as will be apparent. It will furthermore be apparent that by suitably rotating the shaft 44 and adjusting the valves 50 to the proper position, a frequency variation can be produced over a range sufficient to affect the objects heretofore described.

Having now disclosed my invention, what I claim as new and desire to secure by Letters Patent is:

1. A method of modulating the frequency of vibrations, which consists in passing said vibrations through a column of fluid and simultaneously therewith moving said fluid alternately in opposite directions longitudinally of the column.

2. The method defined in claim 1 in which said fluid is a gas.

3. The method defined in claim 1 in which said fluid is moved by forcing fluid into one part of the column while extracting fluid from a longitudinally remote part thereof.

4. The method defined in claim 1 in which said fluid is a gas and in which the gas is moved in the column by alternately forcing gas into and extracting it from opposite end portions of the column.

5. A method of modulating the frequency of vibrations, which consists in passing said vibrations through a column of fluid, simultaneously therewith moving said fluid alternately in opposite directions longitudinally of the column, and varying the modulating range by varying the speed of movement of said fluid.

6. A method of modulating the frequency of vibrations, which consists in passing said vibrations through a column of gas, simultaneously therewith moving said gas alternately in opposite directions longitudinally of the column by alternately forcing gas into and extracting it from different longitudinal portions of the column, and varying the modulating range by varying the amount of gas forced into and extracted from the column.

7. A method of modulating the frequency of vibrations, which consists in impinging vibrations on one end of a column of fluid, and moving said fluid alternately in opposite directions longitudinally of the column while transmitting said vibrations longitudinally therethrough and receiving the same at the other end of the column.

8. A method of modulating the frequency of vibrations, which consists in impinging vibrations on one end of a column of gaseous fluid, moving said fluid alternately in opposite directions longitudinally of the column by alternately forcing fluid into and extracting it from longitudinally spaced portions of the column while transmitting said vibrations longitudinally therethrough and receiving the same at the other end of the column, and varying the modulating range by varying the amount of fluid forced into and extracted from the column.

9. A method of producing modulated supersonic frequencies, which consists in generating and impinging air wave impulses of predetermined frequency on a diaphragm, transmitting said impulses from said diaphragm through a body of fluid to a second diaphragm, and simultaneously therewith modulating the frequency of said impulses by setting the fluid in said body in motion toward one of said diaphragms.

10. A method of producing modulated supersonic frequencies, which consists in generating and impinging air wave impulses of predetermined frequency on a diaphragm, transmitting said impulses from said diaphragm through a column of gaseous fluid to a second diaphragm, and simultaneously therewith continuously varying the frequency of said impulses through a predetermined range by moving said fluid alternately in opposite directions along the longitudinal axis of the column.

11. Apparatus for modulating the frequency of vibrations comprising means providing an elongated chamber, means for transmitting sound waves longitudinally through the chamber, means providing ports at opposite end portions of the chamber, and means for causing fluid to move alternately in opposite directions longitudinally in the chamber by forcing fluid sequentially through said ports.

12. The apparatus defined in claim 11 in which the last named means comprises a reciprocating pump with opposite end portions in communication with said ports.

13. The apparatus defined in claim 11 plus means for varying the amount of fluid passed through said ports.

14. Apparatus for modulating the frequency of vibrations, comprising means providing an elongated chamber, diaphragms at opposite ends of the chamber, and means for moving fluid in either direction longitudinally in the chamber between the diaphragms.

15. Apparatus for modulating the frequency of vibrations, comprising means providing a tubular chamber, diaphragms substantially closing the ends of the chamber, means outside the chamber for receiving and transmitting vibrations to and from the diaphragms, means providing ports to the end portions of the chamber, and means including a pump for forcing fluid in alternately opposite directions through the ports and chamber.

16. The apparatus defined in claim 15 in which the diaphragms fully close the ends of the chamber and are capable of transmitting said vibrations therethrough to and from the chamber.

17. The apparatus defined in claim 15 in which the pump embodies two pistons at opposite sides of a rotary member operatively connected to both pistons.

18. The apparatus defined in claim 15 plus valves for varying the flow of fluid through the ports between the pump and chamber.

19. The apparatus defined in claim 15 plus a second chamber and valves for controlling the flow of fluid between the pump and chambers.

20. An apparatus for producing modulated supersonic frequencies, comprising means providing an elongated chamber, vibratory diaphragms at and closing the ends of the chamber, means for generating and impinging air wave impulses of predetermined frequency on one of the diaphragms outside the chamber, and means for modulating the frequency of said impulses by giving movement to the fluid in said chamber through which the impulses are transmitted from said one diaphragm to the other diaphragm.

21. The apparatus defined in claim 20 in which said fluid in the chamber is a gaseous fluid and wherein the last named means gives movement to said fluid alternately in opposite directions longitudinally of the chamber.

CAPERTON B. HORSLEY.

REFERENCES CITED

The following references are of record in the file of this patent:

UNITED STATES PATENTS

| Number | Name | Date |
|---|---|---|
| 1,591,471 | Constantinesco | July 6, 1926 |